(12) United States Patent
Higashi (10) Patent No.: US 11,310,422 B2
(45) Date of Patent: Apr. 19, 2022

(54) IMAGING APPARATUS AND CONTROL METHOD THEREOF OF WITH DETERMINING OF DRIVING RANGE IN WHICH PANNING DRIVER OR TILTING DRIVER ROTATES IMAGING UNIT

(71) Applicant: CANON KABUSHIKI KAISHA, Tokyo (JP)

(72) Inventor: Hidenori Higashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/188,658

(22) Filed: Nov. 13, 2018

(65) Prior Publication Data
US 2019/0182426 A1    Jun. 13, 2019

(30) Foreign Application Priority Data

Dec. 7, 2017    (JP) .............................. JP2017-234799

(51) Int. Cl.
*H04N 5/232*    (2006.01)
*H04N 5/225*    (2006.01)

(52) U.S. Cl.
CPC ....... *H04N 5/23264* (2013.01); *H04N 5/2254* (2013.01); *H04N 5/2328* (2013.01);
(Continued)

(58) Field of Classification Search
CPC ............. H04N 5/23264; H04N 5/2328; H04N 5/23258; H04N 5/23267; H04N 5/23299; H04N 5/2254; H04N 5/23229
(Continued)

(56) References Cited

U.S. PATENT DOCUMENTS

2006/0127071 A1*    6/2006    Takeuchi ........... H04N 5/23248
                                                                               396/55
2006/0176372 A1*    8/2006    Moriya ................... G03B 17/00
                                                                               348/208.4
(Continued)

FOREIGN PATENT DOCUMENTS

JP       2006-080837 A      3/2006
JP       2009-139827 A      6/2009
(Continued)

OTHER PUBLICATIONS

Oct. 5, 2021 Japanese Official Action in Japanese Patent Appln. No. 2017-234799.

*Primary Examiner* — Lin Ye
*Assistant Examiner* — Chan T Nguyen
(74) *Attorney, Agent, or Firm* — Venable LLP (57) ABSTRACT

An imaging apparatus comprises a first correcting unit configured to correct image blur by driving at least one of a panning driver that rotates an imaging unit including an imaging optical system and an image sensor in the horizontal direction, and a tilting driver that rotates the imaging unit in the vertical direction; a shake detection unit configured to detect shake; a calculation unit configured to calculate an amount of image blur correction in accordance with the shake detected by the shake detection unit; and a determination unit configured to determine a driving range required by the panning driver or the tilting driver in order to correct an image blur, in accordance with the amount of image blur correction and a mechanical driving end of the panning driver or the tilting driver.

13 Claims, 5 Drawing Sheets

(52) U.S. Cl.
CPC ..... *H04N 5/23229* (2013.01); *H04N 5/23258* (2013.01); *H04N 5/23267* (2013.01); *H04N 5/23299* (2018.08)

(58) Field of Classification Search
USPC ...................................................... 348/208.4
See application file for complete search history.

(56) References Cited

U.S. PATENT DOCUMENTS

| | | | | |
|---|---|---|---|---|
| 2016/0269648 A1* | 9/2016 | Hayashi | ............ | H04N 5/23206 |
| 2017/0155828 A1* | 6/2017 | Irie | .................. | H04N 5/23296 |
| 2017/0230580 A1* | 8/2017 | Ohara | ................ | H04N 5/23245 |
| 2018/0106605 A1* | 4/2018 | Watanabe | ............. | G01B 11/24 |

FOREIGN PATENT DOCUMENTS

| | | | |
|---|---|---|---|
| JP | | 2013-134310 A | 7/2013 |
| JP | | 2015-219401 A | 12/2015 |

* cited by examiner

|  |  | Electronic image blur correction | |
|---|---|---|---|
|  |  | Enabled | Disabled |
| Optical image blur correction | Enabled | (1) | (2) |
|  | Disabled | (3) | (4) |

FIG. 4B

| State | (1) | (2) | (3) | (4) |
|---|---|---|---|---|
| Increase in PT driving range | ± 4 degrees | ± 3 degrees | ± 1 degree | ± 0 degrees |

FIG. 5

IMAGING APPARATUS AND CONTROL METHOD THEREOF OF WITH DETERMINING OF DRIVING RANGE IN WHICH PANNING DRIVER OR TILTING DRIVER ROTATES IMAGING UNIT

This application claims the benefit of Japanese Patent Application No. 2017-234799, filed December 2017, which is hereby incorporated by reference herein in its entirety.

BACKGROUND OF THE INVENTION

Field of the Invention

The present invention relates to an imaging apparatus and a control method therefor.

Description of the Related Art

Conventionally, a network camera in which the camera can be controlled by remote operation via a network and by which video images can be monitored has been known. Some network cameras adopt a PT (pan/tilt) model having a mechanism that performs panning (horizontal rotation) and tilting (vertical rotation), in which a camera head portion rotates and shooting directions can be changed freely by remote operation.

Additionally, some network cameras have an image blur correction function in order to reduce a blur of a shot image caused by a vibration of an installation environment. Methods for image blur correction include, for example, electronic image blur correction that performs correction by using image processing and optical image blur correction that optically performs correction by lens driving. There is also a method referred to as "PT image blur correction" that achieves image blur correction by driving a lens barrel unit that includes a lens and an image sensor in response to shaking by using the pan-tilt mechanism described above. The PT image blur correction also can perform correction to shaking with large amplitude, in particular, it is effective in an installation environment in which large shaking occurs such as shaking on board. Japanese Patent Application Laid-Open No. 2006-80837 discloses a technique that performs correction by controlling the PT against a vibration with a predetermined frequency or less, based on a detected vibration. Additionally, Japanese Patent Application Laid-Open No. 2009-139827 discloses a method that acquires a shake signal in the direction of gravity by an acceleration sensor, decomposes the shake signal into a component parallel to an image sensor and a component perpendicular to the image sensor by using a tilt angle, and corrects parallel shift shaking by using the parallel shake component.

In the mechanical configuration of the pan/tilt mechanism, there are end points where panning driving and tilting driving can be performed, and the rotation in the panning direction and the tilting direction exceeding the end points is impossible. However, in Japanese Patent Application Laid-Open No. 2006-80837 and Japanese Patent Application Laid-Open No. 2009-139827, no consideration is taken to a case in which PT image blur correction is used by a network camera that is located at the end point of the panning direction or tilting direction Hence, if the network camera is located at the end point of the panning and tilting directions, the driving required for the image blur correction cannot be performed, and as a result, an image that is easy to see may not be provided to a user.

SUMMARY OF THE INVENTION

The present invention provides an imaging apparatus that can perform advantageous image blur correction by using a pan/tilt driving unit.

An imaging apparatus comprising: at least one processor and at least one memory functioning as: a first correcting unit configured to correct image blur by driving at least one of a panning driver that rotates an imaging unit including an imaging optical system and an image sensor in the horizontal direction and a tilting driver that rotates the imaging unit in the vertical direction; a shake detection unit configured to detect shake; a calculation unit configured to calculate an amount of image blur correction in accordance with the shake detected by the shake detection unit; and, a determination unit configured to determine a driving range required by the panning driver or the tilting driver in order to correct image blur, in accordance with the amount of image blur correction and a mechanical driving end of the panning driver or the tilting driver.

Further features of the present invention will be described from the following description of the example description with reference to the attached drawings.

DESCRIPTION OF THE EMBODIMENTS

First Embodiment

Figure 1:
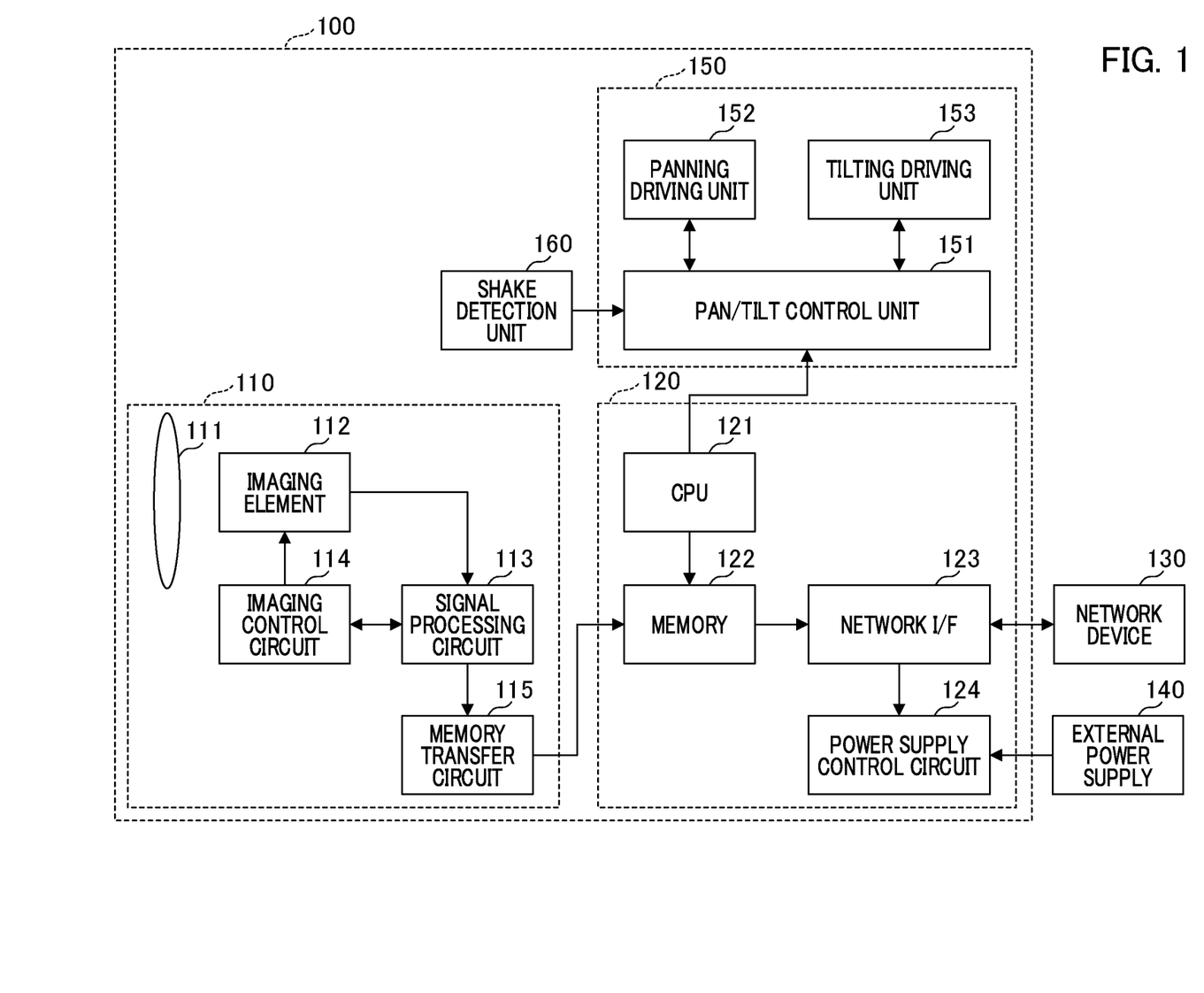
FIG. 1 illustrates a configuration example of an imaging apparatus.

FIG. 1 illustrates a configuration example of an imaging apparatus. An imaging apparatus 100 of the present embodiment is a network camera that can transmit images and perform remote operation via a network. The imaging apparatus 100 includes an imaging unit 110, a network control unit 120, a pan-tilt mechanism 150, and a shake detection unit 160.

The imaging unit 110 includes an optical lens 111, an imaging element 112, a signal processing circuit 113, an imaging control circuit 114, and a memory transfer circuit 115. The imaging element 112 has a photoelectric conversion unit, converts a light formed through an imaging optical system including the optical lens 111 into an electric charge, and generates an imaging signal. The signal processing circuit 113 inputs and digitizes the imaging signal imaged by the imaging element 112, and generates a captured image. The imaging control circuit 114 controls the imaging element 112 with a cycle that is the same as that of the output period of the image. Additionally, if an accumulation time is longer than the output cycle of the image, the imaging control circuit 114 controls the signal processing circuit 113 so as to hold the captured image of a frame memory of the signal processing circuit 113, during the period of time when the imaging signal cannot be output from the imaging element 112. The memory transfer circuit 115 transfers the captured image digitized by the signal processing circuit 113 to a memory 122 in the network control unit 120.

The network control unit 120 of the camera includes a CPU 121, the memory 122, a network I/F 123, and a power supply control circuit 124. The CPU (Central Processing Unit) 121 is a processor that controls each unit of the imaging apparatus 100. The memory 122 is a memory such as a RAM and a ROM connected to the CPU 121. The image data transferred to the memory 122 is transmitted to an external network device 130 by the memory transfer circuit 115 through the network I/F 123. The power supply control circuit 124 receives a power supply from the network device 130 or an external power supply 140 through a network cable or a power cable and controls the power supply to the imaging unit 110 and the network control unit 120. Note that although the power supply control circuit 124 is illustrated as being located in the network control unit 120, it may be located outside the network control unit 120.

The network device 130 and the external power supply 140 are connected to the imaging apparatus 100. The network device 130 can receive not only a distribution of images from the imaging apparatus 100, but can also supply power to the imaging apparatus 100 through the network cable. The external power supply 140 can supply a power to the imaging apparatus 100.

The pan/tilt mechanism 150 includes a pan/tilt control unit 151, a panning driving unit 152, and a tilting driving unit 153, and pan/tilt-drives the imaging unit 110. The pan/tilt control unit 151 controls the panning driving unit 152 and the tilting driving unit 153 based on the transmitted instruction. The panning driving unit 152 has a mechanical driving system that performs a pan operation (panning operation), a motor that is the driving source thereof, and an angle sensor that detects an angle of the driving unit. The tilting driving unit 153 has a mechanical driving system that performs a tilt operation (tilting operation), a motor that is the driving source thereof, and an angle sensor that detects an angle of the driving unit. The operations of the panning driving unit 152 and the tilting driving unit 153 are controlled by the pan/tilt control unit 151.

A shake detection unit 160 is configured by, for example, a gyro sensor and detects an angular velocity in the panning direction and the tilting direction of the imaging apparatus 100. The angular velocity information detected by the shake detection unit 160 is transmitted to the imaging unit 110 and the pan/tilt control unit 151, and is used for image blur correction to be described below. Note that the position of the shake detection unit 160 may be a position at which the pan/tilt drive is not performed together with the imaging unit 110 in the imaging apparatus 100, or may be a position at which the pan-tilt drive is performed together with the imaging unit 110. Additionally, since the shaking caused in the imaging apparatus 100 is also caused by the shaking (vibration) of the installation location of the imaging apparatus 100, the shake detection unit 160 may detect the shaking of the installation location of the imaging apparatus 100.

Figure 2A:
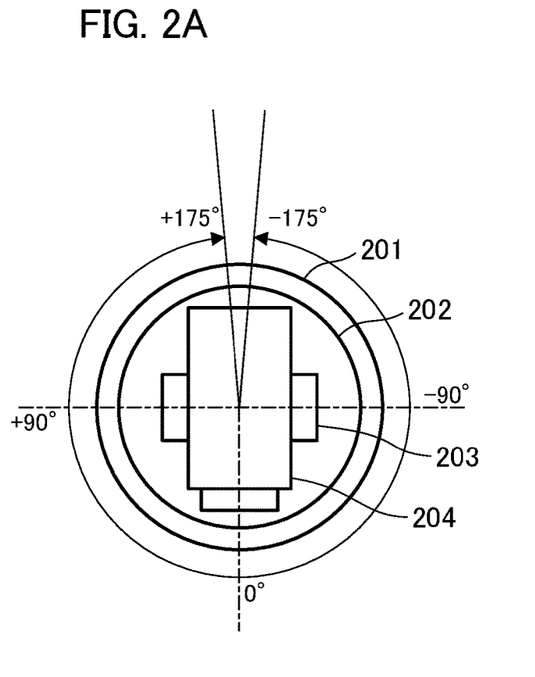
FIGS. 2A and 2B illustrate panning driving and tilting driving.
Figure 2B:
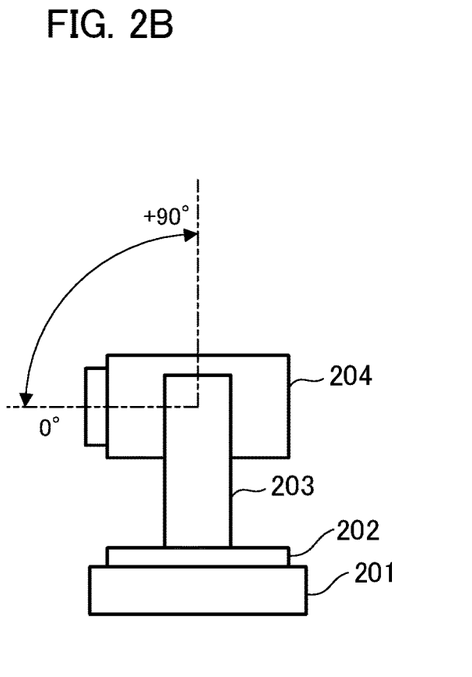

FIGS. 2A and 2B illustrate panning driving and tilting driving. FIG. 2A illustrates the imaging apparatus 100 as viewed from above. FIG. 2B illustrates the imaging apparatus 100 as viewed from the side. The panning driving unit 152 includes a bottom case 201 and a turn table 202. The turntable 202 rotates in the horizontal direction to the ground contact surface, and thereby panning driving is performed. The panning driving unit 152 according to the present embodiment can rotate from −175 degrees to +175 degrees in the horizontal direction. Accordingly, the mechanical driving ends that are the structural driving ends of the panning driving unit 152 are −175 degrees and +175 degrees.

The tilting driving unit 153 includes a camera head support 203 and a camera head 204 provided on the turn table 202. Tilting driving is performed by the rotation of the camera head 204 in the vertical direction. The tilting driving unit 153 of the present embodiment can rotate from 0 degrees in the horizontal direction to 90 degrees in the upward direction. Accordingly, the mechanical driving ends that are the structural driving ends of the tilting driving unit 153 are 0 degrees and 90 degrees. As described above, the imaging apparatus 100 according to the present embodiment performs pan-tilt driving by rotating the camera head 204 in the horizontal direction and the vertical direction, and can perform shooting while changing the imaging direction.

For example, if the panning driving unit 152 is located at the end point (mechanical driving end) of the mechanism, the panning driving unit 152 may not be appropriately driven for image blur correction. Specifically, if the panning driving unit 152 is located at the position of +175 degrees, it is physically impossible to further drive the panning driving unit 152 in the + direction for image blur correction. Accordingly, if the panning driving unit 152 is located at the end point of the mechanism or located near the end point where the driving range required for driving for image blur correction cannot be acquired, a difficulty is caused in performing appropriate pan/tilt image blur correction. The same applies to the tilting driving unit 153. Accordingly, in the present embodiment, a range in which the pan/tilt image blur correction can be appropriately performed is set as a pan/tilt driving range. The pan/tilt driving range becomes narrower than the mechanical drivable range.

Figure 3:
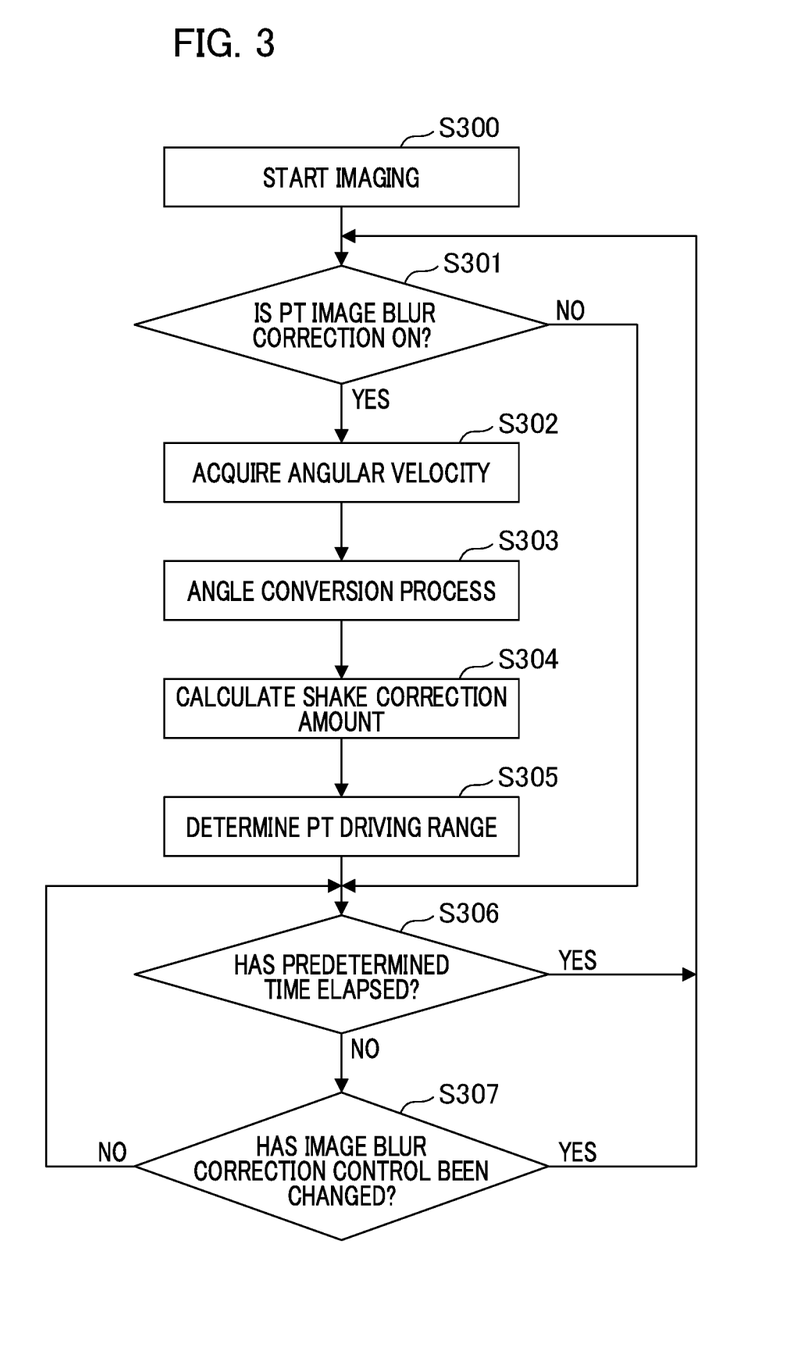
FIG. 3 is a flowchart illustrating a process that determines a driving range in PT image blur correction.

FIG. 3 is a flowchart that illustrates a process that determines a pan/tilt driving range that can appropriately perform pan/tilt image blur correction (hereinafter, referred to as "PT image blur correction"). In the present embodiment, a PT driving amount required for the PT image blur correction is calculated, and the PT end point that is the end point of the pan-tilt driving range where appropriate image blur correction can be performed during the use of the PT image blur correction is determined.

In step S300, the imaging apparatus 100 starts imaging. Imaging starts when a power to the imaging apparatus 100 is supplied to the imaging apparatus 100, and the power is conducted to the imaging apparatus 100 by the power supply control circuit 124. In step S301, the pan/tilt control unit 151 determines whether the PT image blur correction control setting is ON or OFF. In the PT image blur correction control setting, the setting of ON or OFF may be performed by a user, and in addition, the operation of ON or OFF may be performed by analyzing the vibration of the imaging apparatus 100 in the installation environment by the imaging apparatus 100 itself. If the PT image blur correction control setting is determined to be OFF, the process proceeds to step S306. If it is determined in step S306 that a predetermined time has elapsed, the process returns to step S301 and the determination of whether the PT image blur correction control setting is ON or OFF is performed again. In contrast, if the PT image blur correction control setting is ON, the process proceeds to step S302.

In step S302, the pan/tilt control unit 151 acquires the angular velocity in the panning direction and the angular velocity in the tilting direction detected by the shake detection unit 160. In step S303, the pan/tilt control unit 151 performs an angle conversion process that converts the angular velocity acquired in step S302 into an angle value.

Specifically, the pan/tilt control unit 151 integrates the acquired angular velocity in the panning direction and calculates the panning angle value. Similarly for the tilting direction, the pan/tilt control unit 151 time-integrates the acquired angular velocity in the tilting direction and calculates the tilt angle value.

In step S304, the pan/tilt control unit 151 calculates the shake correction amount based on the angle value calculated in step S303. Specifically, the pan/tilt control unit 151 calculates a shake correction amount in the panning direction based on the calculated panning angle value. Similarly, the pan/tilt control unit 151 calculates a shake correction amount in the tilting direction based on the calculated tilting angle value. The shake correction amounts are calculated so as to cancel an amount of the angle caused by the shaking. For example, if the panning angle value is 10 degrees and the tilting angle value is 5 degrees, the shake correction amount is −10 degrees in the panning direction and −5 degrees in the tilting direction.

In step S305, the pan/tilt control unit 151 determines a PT driving range. The pan/tilt control unit 151 calculates a panning driving range and a tilting driving range in which the PT image blur correction can be appropriately performed, based on the calculated shake correction amounts in the panning direction and tilting direction, the mechanical panning driving range, and the mechanical tilting driving range of the imaging apparatus 100. The calculation of the PT driving range will be described below in detail with reference to FIGS. 4A and 4B. Note that, in calculating the PT driving range, the zoom position may be taken into consideration. The pan/tilt control unit 151 drives the panning driving unit 152 and the tilting driving unit 153 within the determined PT driving range. Accordingly, it is possible to avoid a case in which appropriate image blur correction cannot be performed.

In step S306, the pan/tilt control unit 151 determines whether or not a predetermined time has elapsed after determining the PT driving range in step S305. Here, the reason for determining whether or not the predetermined time has passed is to newly set a panning driving range and a tilting driving range and perform appropriate PT image blur correction if the ON or OFF setting of the PT image blur correction is changed by the user due to the passage of time, or if there is a change in the shaking that is being generated. If the predetermined time has elapsed, the process returns to step S301 to confirm the setting of the image blur correction again. In contrast, if the predetermined time has not elapsed, the process proceeds to step S307.

In step S307, the pan/tilt control unit 151 determines whether or not the setting of the enabling or the disabling (ON or OFF) of the image blur correcting unit that is different from the PT image blur correction has been changed. Here, the reason for confirming whether or not there is a change in the setting of enabling or disabling of the image blur correcting unit that is different from the PT image blur correction is to perform PT image blur correction by taking into consideration the shaking corrected by the image blur correcting unit that is different from the PT image blur correction. This is because, for example, it is necessary to determine the panning driving range and the tilting driving range during the use of the PT image blur correction by taking into consideration the shaking eliminated by the lens if the user operates the image blur correction function provided in the lens. If there is a change in the setting of enabling or disabling of the image blur correcting unit that is different from the PT image blur correction, the process returns again to step S301 to confirm the image blur correction setting. In contrast, if there is no change in the setting of enabling or disabling of the image blur correcting unit that is different from the PT image blur correction, the process returns to step S306. Note that a notification may be provided to the pan/tilt control unit 151 if there is a change in the setting of enabling or disabling of the image blur correcting unit that is different from the PT image blur correction.

Figure 4A:
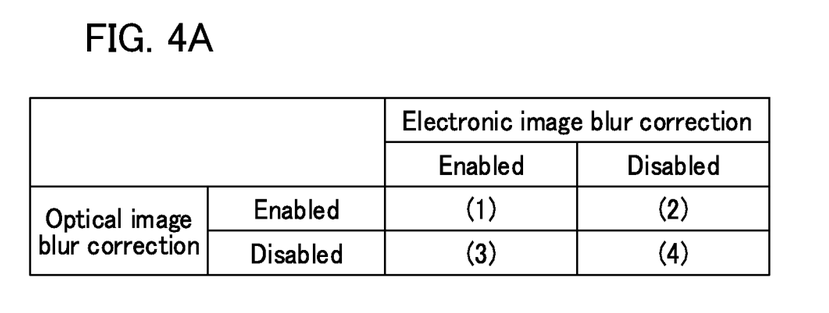
FIGS. 4A and 4B are diagrams of a combination of image blur corrections and an increased amount of a PT range.
Figure 4B:
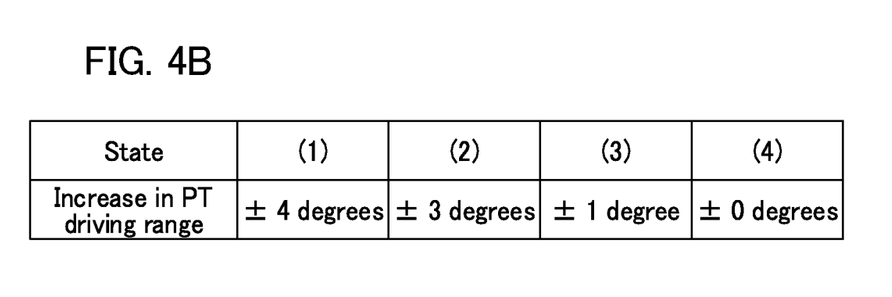

The calculation of the PT driving range in step S305 will be described with reference to FIGS. 4A and 4B. FIGS. 4A and 4B illustrate each combination of the image blur corrections, and an increased amount of the PT driving range. FIG. 4A illustrates each combination of the PT image blur correction and another image blur correction. FIG. 4B illustrates a PT range that is increased in each combination of the image blur corrections. With reference to FIGS. 4A and 4B, a specific example for calculating a PT driving range required for determining the PT driving range shown in step S305 will be described.

In the present embodiment, it is assumed that the imaging apparatus 100 has the functions of electronic image blur correction and optical blur correction serving as image blur corrections that are different from the PT image blur correction, in addition to the PT image blur correction. In the electronic image blur correction, the shaking is electronically corrected by calculating an amount of blur between consecutive images and changing the cut-out position of the image in accordance with the calculated amount. In the optical blur correction, the shaking is optically corrected by appropriately shifting the optical lens 111 in a plane orthogonal to the optical axis. The PT image blur correction is effective for a vibration of ±20 degrees at the maximum as an incline angle. The electronic image blur correction is generally effective for a vibration of ±1 degree or less as an incline angle. The optical image blur correction is generally effective for a vibration of ±3 degrees or less as an incline angle.

The setting of the image blur correction that is different from the PT image blur correction corresponds to the setting state of any one of the combinations of (1) to (4) in FIG. 4A. In setting (1), the electronic image blur correction and the optical image blur correction are both enabled. As described above, a vibration having a maximum ±1 degree can be corrected by enabling the electronic image blur correction and the vibration having a maximum ±3 degrees can be corrected by enabling the optical image blur correction. Consequently, it is possible to correct the shaking of ±4 degrees in total by using the image blur correction function that is different from the PT image blur correction. Hence, as shown in (1) of FIG. 4B, it is possible to increase the PT driving range only by ±4 degrees compared with the case in which only the PT image blur correction is performed.

In setting (2), the optical image blur correction is enabled while the electronic image blur correction is disabled. As described above, the vibration of a maximum of ±3 degrees can be corrected by enabling the optical image blur correction. Accordingly, the shaking of ±3 degrees can be corrected by using the image blur correction function that is different from the PT image blur correction. Therefore, as shown in (2) of FIG. 4B, it is possible to increase the PT driving range only by ±3 degrees, compared with the case in which only the PT image blur correction is performed.

In setting (3), the optical image blur correction is disabled while the electronic image blur correction is enabled. As described above, the vibration of the maximum ±1 degree can be corrected by enabling the electronic image blur correction. Accordingly, the shaking of ±1 degree can be corrected by using the image blur correction function that is different from the PT image blur correction. Therefore, as shown in (3) of FIG. 4B, it is possible to increase the PT driving range only by ±1 degree, compared with the case in which only the PT image blur correction is performed.

In setting (4), the electronic image blur correction and the optical image blur correction are both disabled. In this case, it is not possible to correct the shaking by using the image blur correction function that is different from the PT image blur correction. Therefore, as shown in (4) of FIG. 4B, it is impossible to enlarge the PT driving range.

Thus, it is possible to increase the PT driving range during the use of the PT image blur correction by using the electronic image blur correcting function and the optical image blur correcting function of the network camera together with the PT image blur correction. Accordingly, in determining the PT driving range, it is necessary to determine the PT driving range by taking into consideration the correction range in which correction can be performed by using the image blur correction function that is different from the PT image blur correction. Note that in the present embodiment, although the PT driving range has been described as an example, the present invention may be applied to either of the panning driving range and the tilting driving range.

Note that in the present embodiment, although the example has been described in which the electronic image blur correction and the optical image blur correction are performed to serve as the image blur correction that is different from the PT image blur correction, the present invention may execute only one of them. Switching between "enabling" and "disabling" of the electronic image blur correction function and the optical image blur correction function may be performed by a switch operation or may be performed by another unit. Note that if the PT driving range that is close to the mechanical limit is not required, the image blur correction function having a service life such as the image blur correction function of the optical lens is set to disabling, and as a result, the durability of the lens can be improved without reducing the service life of the lens.

As described above, according to the present embodiment, it is possible to avoid a case in which the image blur correction cannot be performed by setting the PT driving range, and as a result, an image to which advantageous image blur correction has been performed and is easy to see can be provided to a user.

Second Embodiment

Figure 5:
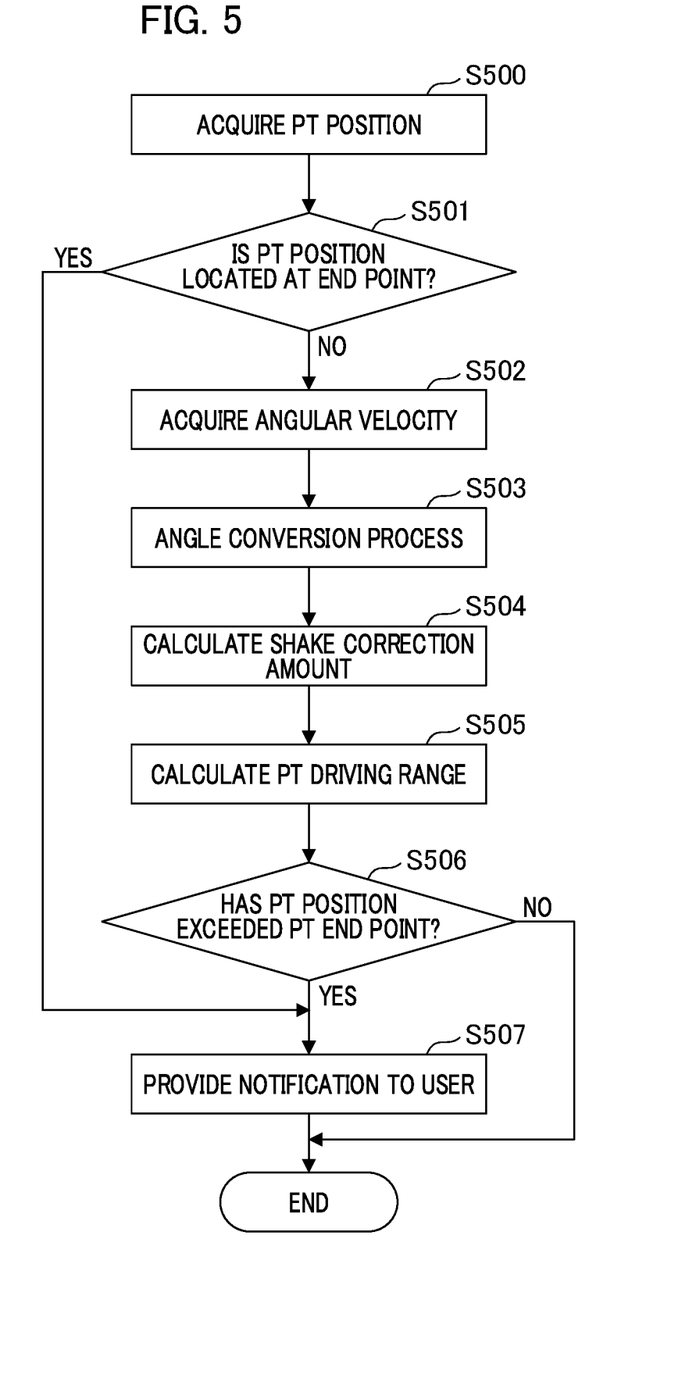
FIG. 5 is a flowchart of a notification process in the case in which a PT driving unit exceeds a PT driving range.

FIG. 5 is a flowchart of a notification process if the panning driving unit 152 or the tilting driving unit 153 exceeds the PT driving range. The configuration of the imaging apparatus 100 and the basic flow of the PT image blur correction according to the present embodiment are the same as those in the first embodiment.

In the flowchart of FIG. 5, the imaging apparatus 100 is shooting in a state in which the PT image blur correction function is enabled. In step S500, the pan/tilt control unit 151 acquires the PT position that is the current position of the panning driving unit 152 and the tilting driving unit 153. In step S501, the pan/tilt control unit 151 determines whether or not the current PT position acquired in step S500 is a mechanical end point (mechanical driving end) in pan-tilt driving of the imaging apparatus 100. If the acquired PT position is the mechanical PT end point, it is apparent that the panning driving range and the tilting driving range that are required for the PT image blur correction cannot be secured, and accordingly, the shaking cannot be eliminated by using the PT image blur correction, so the process proceeds to step S507 to provide a notification to the user. In contrast, if the acquired PT position is not the mechanical PT end point, the process proceeds to step S502.

In step S502, the pan/tilt control unit 151 acquires the angular velocity in the panning direction and the angular velocity in the tilting direction from the shake detection unit 160. In step S503, the pan/tilt control unit 151 performs an angle conversion process that converts the angular velocity acquired in step S502 into an angle value. Specifically, the pan/tilt control unit 151 integrates the acquired angular velocity in the panning direction and calculates a panning angle value. Similarly for the tilting direction, the pan/tilt control unit 151 time-integrates the acquired angular velocity in the tilting direction and calculates a tilting angle value.

In step S504, the pan/tilt control unit 151 calculates a shake correction amount based on the angle value calculated in step S503. Specifically, the pan/tilt control unit 151 calculates a shake correction amount in the panning direction based on the calculated panning angle value. Similarly, the pan/tilt control unit 151 calculates a shake correction amount in the tilting direction based on the calculated tilting angle value. The shake correction amount is calculated so as to cancel the amount of the angle generated due to shaking. For example, if the panning angle value is 10 degrees and the tilting angle value is 5 degrees, the shake correction amounts are −10 degrees in the panning direction and −5 degrees in the tilting direction.

In step S505, the pan/tilt control unit 151 determines the PT driving range. The pan/tilt control unit 151 calculates a panning driving range and a tilting driving range where the PT image blur correction can be appropriately performed, based on the calculated shake correction amounts in the panning direction and the tilting direction, and the mechanical panning driving range and the mechanical tilting driving range of the imaging apparatus 100.

In step S506, the pan/tilt control unit 151 determines whether or not the PT position acquired in step S501 exceeds the end point of the PT driving range calculated in step S505. If the PT position exceeds the end point of the PT driving range, the driving unit contacts the mechanical PT end point during the correction of the PT image shake, and thus, it is not possible to sufficiently eliminate the shaking, thereby failing to provide an image that is easy to see to the user. Accordingly, the process proceeds to step S507 to provide a notification to the user. In contrast, if the PT position has not exceeded the end point of the PT driving range, the present process ends.

In step S507, the pan/tilt control unit 151 provides a notification to the user. A notification in which the current setting is insufficient for performing blur correction may be provided, or a notification that provides an instruction to set an image blur correction function other than the PT image blur correction to ON if the image blur correction function other than the PT image blur correction is OFF may be provided. Additionally, at the same time that the notification is provided, the setting may be changed so as to enable an image blur correction function other than the PT image blur correction.

Additionally, in the calculation of the PT driving range, for example, it may be possible that a history of the panning driving range and the tilting driving range that are required for the PT image blur correction remains, and based on the history, the panning driving range and the tilting driving range that are required for the PT image blur correction are predicted, and the PT driving range is calculated. The prediction of the panning driving range and the tilting driving range based on the history of the panning driving range and the tilting driving range is, in particular, effective in preset touring that repeats the same operation. The preset touring is a function of a surveillance camera that performs shooting by sequentially moving the shooting positions registered in advance in the designated order and time. Additionally, it is also possible to adopt a configuration that allows the user to designate the PT driving range or a configuration that determines the PT driving range that can be used by taking into consideration in advance the maximum value of the shaking that can be corrected by using PT image blur correction.

As described above, according to the present embodiment, it is possible to provide an imaging apparatus that can perform advantageous PT image blur correction by calculating and taking into consideration the panning driving range and the tilting driving range that are required for the PT image blur correction and can provide an image that is easy to see to the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus comprising:
at least one processor and at least one memory, functioning as:
(1) a first correcting unit configured to correct image blur by driving at least one of (a) a panning driver that rotates an imaging unit including an imaging optical system and an image sensor in the horizontal direction and (b) a tilting driver that rotates the imaging unit in the vertical direction;
(2) a shake detection unit configured to detect shake;
(3) a calculation unit configured to calculate an amount of image blur correction in accordance with the shake detected by the shake detection unit; and
(4) a determination unit configured to determine a pan driving range or a tilt driving range in which the panning driver or the tilting driver rotates the imaging unit for changing an imaging direction according to a pan drive instruction or a tilt drive instruction, wherein the pan driving range or the tilt driving range is determined in accordance with (a) the amount of image blur correction and (b) a mechanical driving end of the panning driver or the tilting driver so that the image blur correction can be performed without reaching the mechanical driving end of the panning driver or the tilting driver even if the imaging unit is rotated according to the pan drive instruction or the tilt drive instruction,
wherein the determination unit makes the pan driving range or the tilt driving range narrower than a mechanical drivable range of the panning driver or the tilting driver in accordance with the amount of image blur correction, and
wherein a range between the mechanical driving end and the pan driving range or the tilt driving range is used for correcting the image blur by the first correcting unit but is not used for changing the imaging direction according to the pan drive instruction or the tilt drive instruction.

2. The imaging apparatus according to claim 1, wherein the determination unit determines the pan driving range or the tilt driving range again after a lapse of a predetermined time after determining the pan driving range or the tilt driving range.

3. The imaging apparatus according to claim 1, wherein the at least one processor and at least one memory further functions as a second correcting unit configured to perform image blur correction,
wherein the second correcting unit is different from the first correcting unit, and
wherein the determination unit determines the pan driving range or the tilt driving range in accordance with a correcting range performed by the first correcting unit and the second correcting unit.

4. The imaging apparatus according to claim 3, wherein, if the setting of enabling or disabling of the second correcting unit is changed, the determination unit determines the pan driving range or the tilt driving range again.

5. The imaging apparatus according to claim 3, wherein the at least one processor and at least one memory further functions as a notification unit configured to provide a notification to a user, and
wherein the notification unit provides a notification to a user if the position of the panning driver or the position of the tilting driver is located at the mechanical driving end.

6. The imaging apparatus according to claim 5, wherein, if the position of the panning driver or the position of the tilting driver exceeds the pan driving range or the tilt driving range, the notification unit provides a notification to a user.

7. The imaging apparatus according to claim 6, wherein, if, in providing a notification to a user, the image blur correction performed by the second correcting unit is set to be disabled, the notification unit provides a notification to a user to enable the image blur correction performed by the second correcting unit.

8. The imaging apparatus according to claim 6, wherein, if, in providing a notification to a user by the notification unit, the image blur correction performed by the second correcting unit is set to be disabled, the at least one processor and at least one memory enables the image blur correction performed by the second correcting unit.

9. The imaging apparatus according to claim 3, wherein the second correcting unit controls at least one of (a) an optical image blur correcting unit that performs optical image blur correction by driving an optical lens or (b) an electronic image blur correcting unit.

10. The imaging apparatus according to claim 1, wherein the shake detection unit detects shake of the imaging apparatus.

11. A control method of an imaging apparatus that corrects image blur by driving at least one of (a) a panning driver that rotates an imaging unit including an imaging optical system and an image sensor in the horizontal direction and (b) a tilting driver that rotates the imaging unit in the vertical direction, the control method comprising:
  detecting shake;
  calculating an amount of image blur correction in accordance with the shake detected in detecting shake; and
  determining a pan or a tilt driving range in which the panning driver or the tilting driver rotates the imaging unit for changing an imaging direction according to a pan drive instruction or a tilt drive instruction, wherein the pan driving range or the tilt driving range is determined in accordance with (a) the amount of the image blur correction and (b) a mechanical driving end of the panning driver or the tilting driver so that the image blur correction can be performed without reaching the mechanical driving end of the panning driver or the tilting driver even if the imaging unit is rotated according to the pan drive instruction or the tilt drive instruction,
  wherein the determining makes the pan driving range or the tilt driving range narrower than a mechanical drivable range of the panning driver or the tilting driver in accordance with the amount of image blur correction, and
  wherein a range between the mechanical driving end and the pan driving range or the tilt driving range is used for correcting the image blur by the first correcting unit but is not used for changing the imaging direction according to the pan drive instruction or the tilt drive instruction.

12. The imaging apparatus according to claim 1, wherein the determination unit determines the pan driving range or the tilt driving range in accordance with a zoom position.

13. The control method according to claim 11, wherein the determining determines the pan driving range or the tilt driving range in accordance with a zoom position.

* * * * *